(12) United States Patent
Spector et al.

(10) Patent No.: US 7,547,078 B2
(45) Date of Patent: *Jun. 16, 2009

(54) ADAPTABLE TRACTION SYSTEM OF A VEHICLE

(75) Inventors: Yuval Spector, Ramat Gan (IL); Dan Raz, Haifa (IL); Avishay Novoplanski, Moshav Beit Zeit (IL); Gregory Rinberg, Haifa (IL)

(73) Assignee: Galileo Mobility Instruments Ltd., Moshav Kfar Truman (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/980,365

(22) Filed: Oct. 31, 2007

(65) Prior Publication Data

US 2008/0061627 A1 Mar. 13, 2008

Related U.S. Application Data

(63) Continuation of application No. 10/498,235, filed as application No. PCT/IL02/00807 on Oct. 3, 2002, now Pat. No. 7,334,850.

(60) Provisional application No. 60/326,430, filed on Oct. 3, 2001.

(51) Int. Cl.
*B60B 19/00* (2006.01)
(52) U.S. Cl. .......................... 305/60; 305/158
(58) Field of Classification Search ............ 305/6–7, 305/40–41, 43, 60, 158, 165, 185; 280/5.22, 280/DIG. 10; 152/251, 306, 185.1, 185; 474/207, 901, 905, 101, 117, 205; 180/9.32
See application file for complete search history.

(56) References Cited

U.S. PATENT DOCUMENTS

| 543,704 | A | 7/1895 | Rudolph | 152/306 |
| 919,826 | A | 4/1909 | Clausen | 152/284 |
| 1,066,328 | A | 7/1913 | Sawyer | 152/287 |
| 2,143,471 | A | 1/1939 | Booharin | 152/336.1 |
| 5,368,526 | A | 11/1994 | Hynes | 474/207 |
| 5,492,390 | A | 2/1996 | Kugelmann, Sr. | 301/5.1 |
| 6,725,895 | B1 | 4/2004 | Tsipov | 152/415 |
| 7,334,850 | B2 * | 2/2008 | Spector et al. | 305/60 |

FOREIGN PATENT DOCUMENTS

| DE | 11 71 755 B | 6/1964 |
| JP | 60-047771 | 3/1985 |
| JP | 9-240526 | 9/1997 |
| WO | 99/21740 A1 | 5/1999 |
| WO | 99/21749 A1 | 5/1999 |

* cited by examiner

*Primary Examiner*—Jason R Bellinger
(74) *Attorney, Agent, or Firm*—The Nath Law Group; Jerald L. Meyer; Jiaxiao Zhang (57) ABSTRACT

A traction system for a vehicle has a support frame that defines a circular track belt support that is revolvable about an axis at its center, a flexible track belt; and a track belt stretching assembly comprising one or more track belt stretching rollers. The system has one traction configuration in which the flexible traction belt is held on said support track forming a substantially circular, wheel-like traction surface, and can change to a stretching state in which said rollers engage said belt and stretch it from its state in said one traction configuration to a stretched state to define one or more other traction configurations of the system.

4 Claims, 15 Drawing Sheets

ADAPTABLE TRACTION SYSTEM OF A VEHICLE

CROSS-REFERENCE TO RELATED APPLICATIONS

This is a continuation application of U.S. Patent No. 7,334,850, issued on Feb. 26, 2008, from U.S. patent application Ser. No. 10/498,235, filed Jun. 10, 2004, which is a national stage entry of PCT/IL02/00807, filed Oct. 3, 2002, which claims the benefit of U.S. Provisional Patent Application No. 60/326,430 filed Oct. 3, 2001. These three applications are incorporated by reference in their entirety.

FIELD OF THE INVENTION

The invention relates to traction systems. More specifically the invention is in the field of personal carriage of disabled persons.

BACKGROUND OF THE INVENTION

Versatile traction systems that permit movement on various different terrains are required for a number of different purposes. A particular example is a wheelchair. In most wheelchairs the traction system consists of wheels (typically one main, large wheel and one auxiliary, small wheel on each side) and it permits to move the wheelchair over smooth horizontal surfaces of such floors or pavements. These traction systems are not suitable for passing obstacles such as steps and others, moving through staircases or moving over rough terrains. A versatile traction system has been described in PCT Publication WO 99/21740. In the system described in this publication, means are provided that can change at will the traction configuration for the purpose of increasing the trafficability and safety. A preferred use of the system described in this PCT publication is wheelchairs.

SUMMARY OF THE INVENTION

In accordance with the invention a new traction system for a vehicle is provided. The term "vehicle" usually refers to a platform that moves over a terrain through wheels or track. This includes self-powered vehicles, for example a sport utility vehicle (SUV) or a carriage without self-powering means. A wheelchair is one specific embodiment of the vehicle in accordance with the invention. As will be appreciated from the disclosure below, the traction system provided by the invention is suitable for a wide variety of vehicles such intended for travelling over different terrains.

The traction system provided by the invention is versatile in that it has a variety of different configurations. It has one configuration particularly suitable for travelling over a relatively smooth terrain, for example, in the case of a wheelchair over floors, pavements or roads. Other configurations are suitable for travelling over difficult terrains, for example, rough surfaces, e.g. a non-paved road, and obstacles. In the case of a wheelchair, for example, the traction system permits the wheelchair to ascend or descend through staircases.

In accordance with the invention, a traction system is provided which utilizes auxiliary rollers that can stretch a flexible traction belt from a substantially circular configuration, into which the traction belt is naturally biased, into other traction configurations, as will be described below.

By a first aspect of the invention there is provided a traction system for a vehicle that comprises:

a support frame defining a circular track belt support that is revolvable about an axis at its center, said axis being in a fixed position with respect to a chassis of the vehicle;
a flexible track belt; and
a track belt stretching assembly comprising one or more track belt stretching rollers;
said system having one traction configuration in which the flexible traction belt is held on said support track forming a substantially circular, wheel-like traction surface, said belt stretching assembly can change to a stretching state in which said rollers engage said belt and stretch it from its state in said one traction configuration to a stretched state to define one or more other traction configurations of the system.

Also provided by the invention, according to another of its aspects, is a vehicle comprising one or more, typically two, traction systems of the first aspect. One example of a vehicle in accordance with this aspect, is a wheelchair.

In accordance with one embodiment, the rollers of the traction system, typically small wheels, are held on distal ends of belt extension arms respectively, that are in turn attached at their proximal ends, typically in a pivotal manner, to the vehicle's chassis.

In accordance with another embodiment of the invention, the revolvable support frame comprises two coaxial support members with a gap between them, that together define said circular track belt support. The void space that extends radially from the axis to the lateral part of the gap defines a belt-stretching assembly-holding space and in said one traction configuration, the belt-stretching assembly is housed within said space.

In the latter embodiment, the belt has preferably a central projection or series of projections that extend into the gap securing the track belt from sliding off its support. The belt-extension rollers similarly consist of two cooperating coaxial wheels that have a gap between them and said projections or series of projections fit into the gap when said rollers engage the track belt in said one or more other traction configurations of the system.

Also provided by another aspect of the invention is a flexible track belt for use in the above traction system.

By one embodiment of this latter aspect, a flexible track belt is provided that forms a closed loop, said belt consisting of a plurality of connected belt elements each of which includes at least two stretchable components. Each of the belt elements is biased into a contracted state by said components in which all members together bias the belt to assume a circular shape. Said belt can be stretched, forming a succession of stretched states by first causing the stretching of one of the at least two of said stretchable components, while the others are still relatively relaxed and gradually, with further extension, causing other of said stretchable components to stretch.

In accordance with a preferred embodiment, all of said belt members are integrally formed.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

A side view of a traction system according to an embodiment of the present invention is shown in a schematic manner in FIGS. 1A, 1B, 1C and 1D to which reference is now made. The traction system generally indicated by arrow 10 includes a large circular frame (to be referred to hereinbelow as "wheel") 12 revolvable around an axle 13. Fitted on the rim of wheel 12 is a flexible traction belt 14. Two extendible belt-stretching arms 16 and 18 are disposed behind wheel 12. The extension of arms 16 and 18 in the embodiment is through a telescopic hydraulic pressure-activated elongation arrangement. Each of the stretching arms 16 and 18 is pivotally connected at its upper end by means of pivots 17 and 18, respectively to a portion 24 of a chassis of a vehicle (not shown). Each of the stretching arms 16 and 18 has a respective tension wheel 20 and 22 connected at its lower end. In the traction configuration seen in FIG. 1A, the traction belt 14 is tightly fitted around wheel 12 and has the wheels in a circular shape. This traction configuration is particularly suitable for moving over a smooth terrain.

Figure 1A:
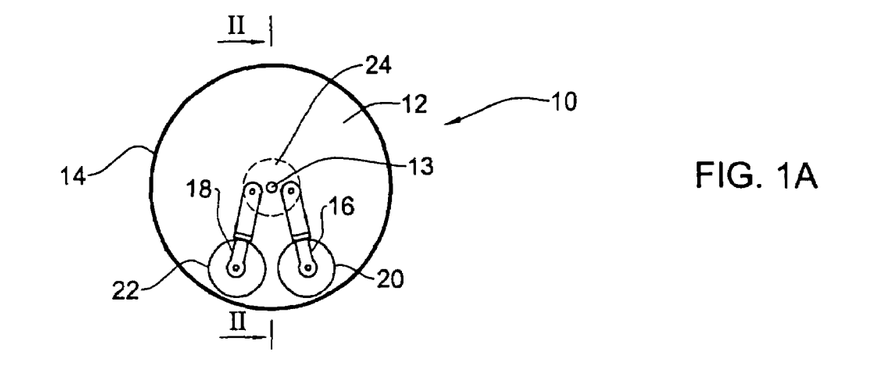
FIG. 1A is a schematic illustration of a side view of an embodiment of a traction system of the invention with retracted chain-stretching arms.
Figure 1B:
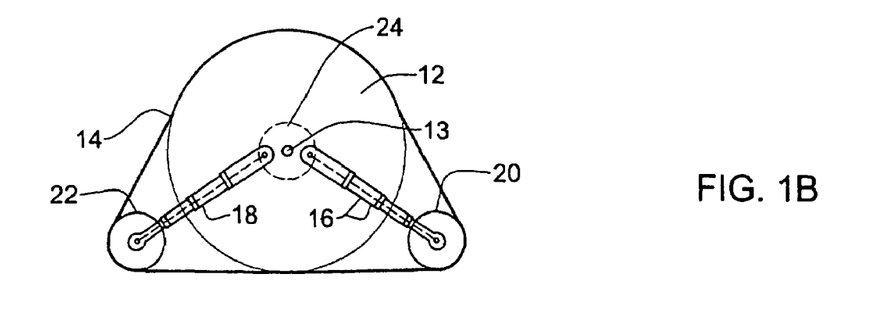
FIG. 1B shows the traction system of FIG. 1A, in one traction configuration with the two belt-extension arms extending beyond the wheel's parameters.

In FIG. 1B the same system is shown with both stretching arms extended in length and angularly displaced one from the other, defining a traction configuration in which traction belt 14 stretches around the upper part of wheel 12 and arrow tension wheels 20 and 22. This traction configuration, as will also be explained below, has improved maneuverability over rough terrains, such as for example, a non-paved surface, as compared to the traction configuration of FIG. 1A.

Figure 1C:
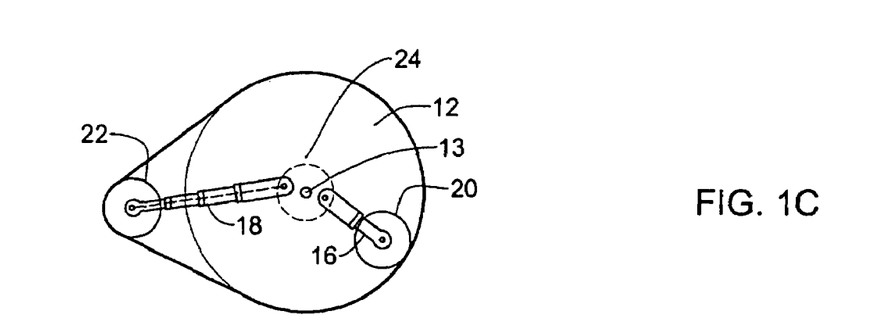
FIG. 1C shows the traction system of FIG. 1A in another traction configuration with only one of the belt-extension arms extended.
Figure 1D:
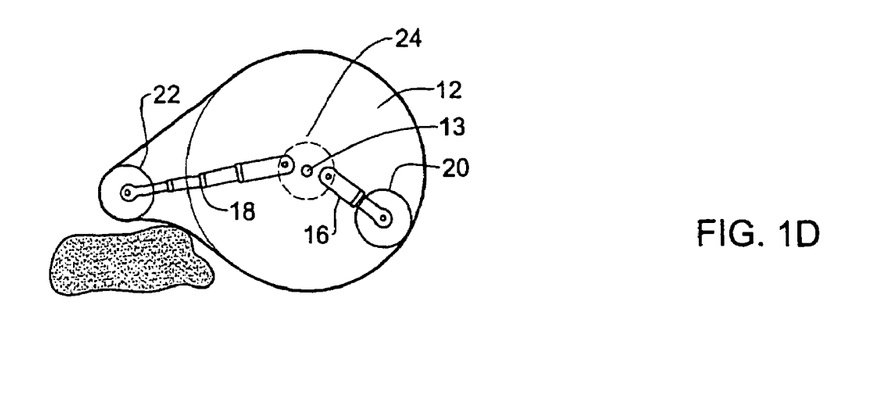
FIG. 1D shows the traction system of FIG. 1A with one of the belt-extension arms in the configuration of FIG. 1C, passing over an obstacle.

In FIG. 1C a different traction configuration is shown in which only one stretching arm 18 and the associated tension wheel 22 is extended, essentially horizontally with the wheel 22 being somewhat more elevated than in the configuration shown in FIG. 1B. In FIG. 1D the system with the same tracking configuration as in FIG. 1C is shown passing over an obstacle, such as a rock 24, with the belt being deformed by the change in distribution of strains on traction belt 14.

Figure 2:
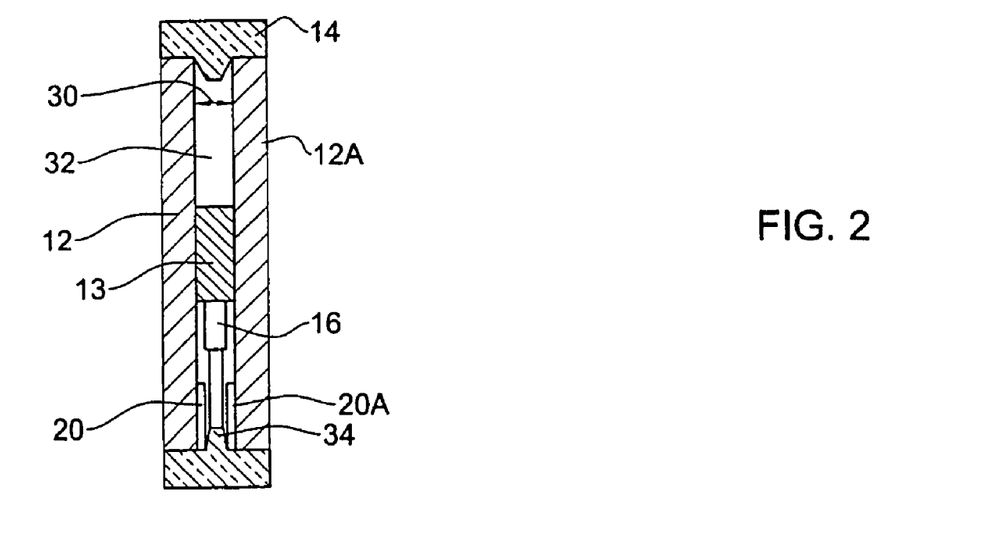
FIG. 2 is a schematic illustration of a cross-section through line II-II in FIG. 1A.

Reference is now being made to FIG. 2 giving a schematic cross-section made through lines II-II in FIG. 1. It should be noted that the relative dimensions of the various components do not actually reflect those dimensions in real life and the changes that were made were for the purpose of ease of illustration. As can be seen, the circular frame consists of wheel 12 and a corresponding coaxial wheel 12A. A gap 30 is formed between them with the space confined between the two wheels constituting a track belt extension assembly confined to space 32.

As can also be seen, wheel 20 has a cooperating coaxial wheel 28 with a gap formed between them as well.

Traction belt 14 is formed with a longitudinal projection or a succession of projections 34 projecting into gap 30. Projection 34 ensures that the belt does not slip off the wheels. As can be seen both in FIG. 1A and FIG. 2, in this retracted configuration, the belt extension assembly is confined to space 32.

Figure 3A:
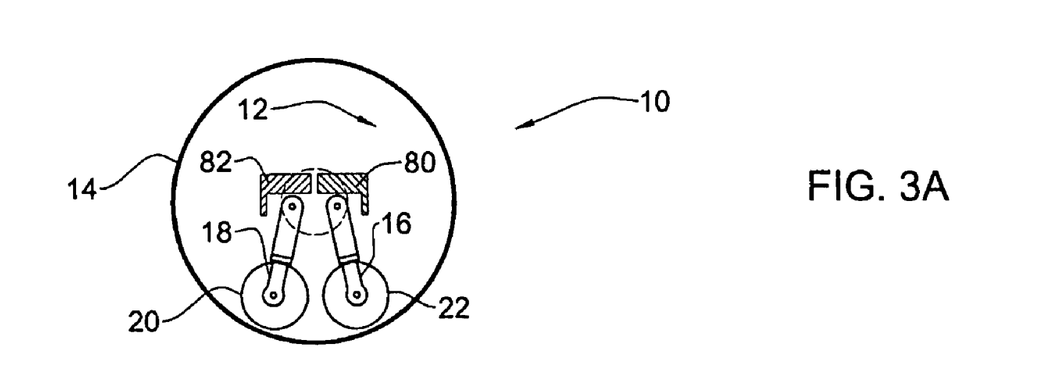
FIG. 3A is a schematic illustration of a side view of an embodiment of the invention including an angle limiter fitted on the chassis.
Figure 3B:
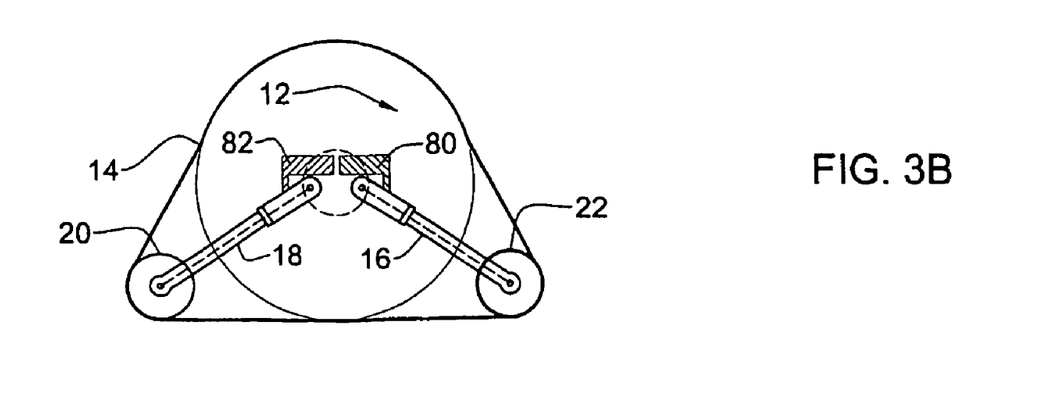
FIG. 3B shows the embodiment of FIG. 5A with a belt-extension abutting the angle limiter.

Reference is now being made to FIG. 3A and 3B showing another embodiment of the invention, similar to that shown in FIGS. 1A-1D, with the addition of an angular limiters 80 and 82 intended to limit the angular displacement of the belt stretching arms. The traction configuration in FIGS. 3A and 3B correspond to those of FIG. 1A and FIG. 1B and the same reference numerals as those used in FIGS. 1A and 1B used herein as well to indicate the same components.

Reference is now being made to FIGS. 4A-4G showing a traction system in accordance with another embodiment of the invention in a variety of views and in different successive traction configuration.

Figure 4A:
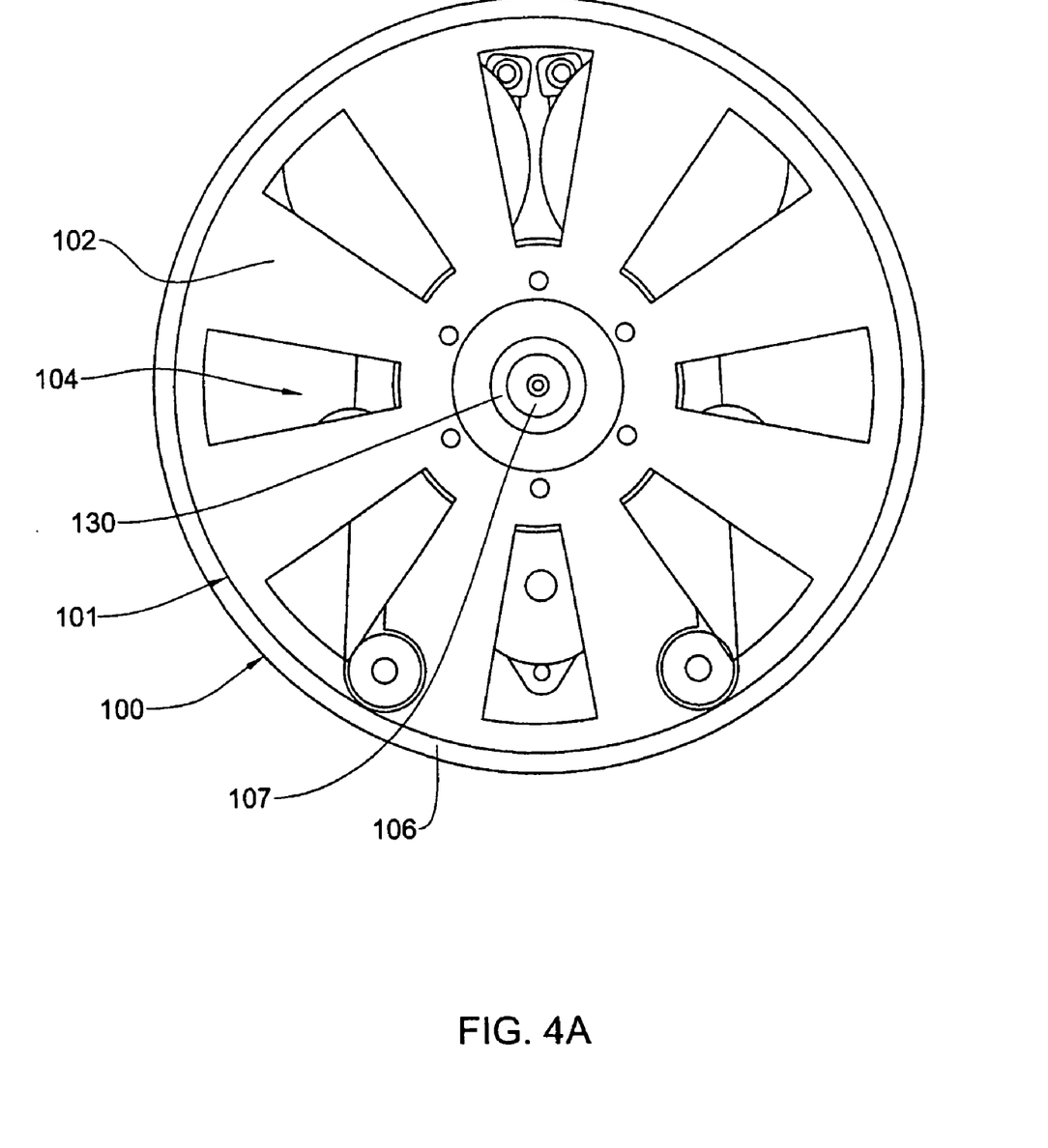
FIG. 4A shows one contracted configuration of a traction system in accordance with an embodiment of the invention.

Reference is first being made to FIG. 4A showing a traction system generally designated 100 with a traction belt support 101 that includes two cooperating and coaxial support wheels 102 with a gap between them. These two wheels 102 define between them a track belt stretching assembly confining space that houses a track belt extension assembly generally designated 104, some components of which can be seen through the cut-out in wheel 102 and which will be explained further below. Fitted over track belt support 101 is a flexible and extendible track belt 106 that is tightly held over track belt support 101. The entire traction system in the configuration shown in FIG. 4A revolves about a fixed axle 107 through the intermediary of bearings 108.

Figure 4B:
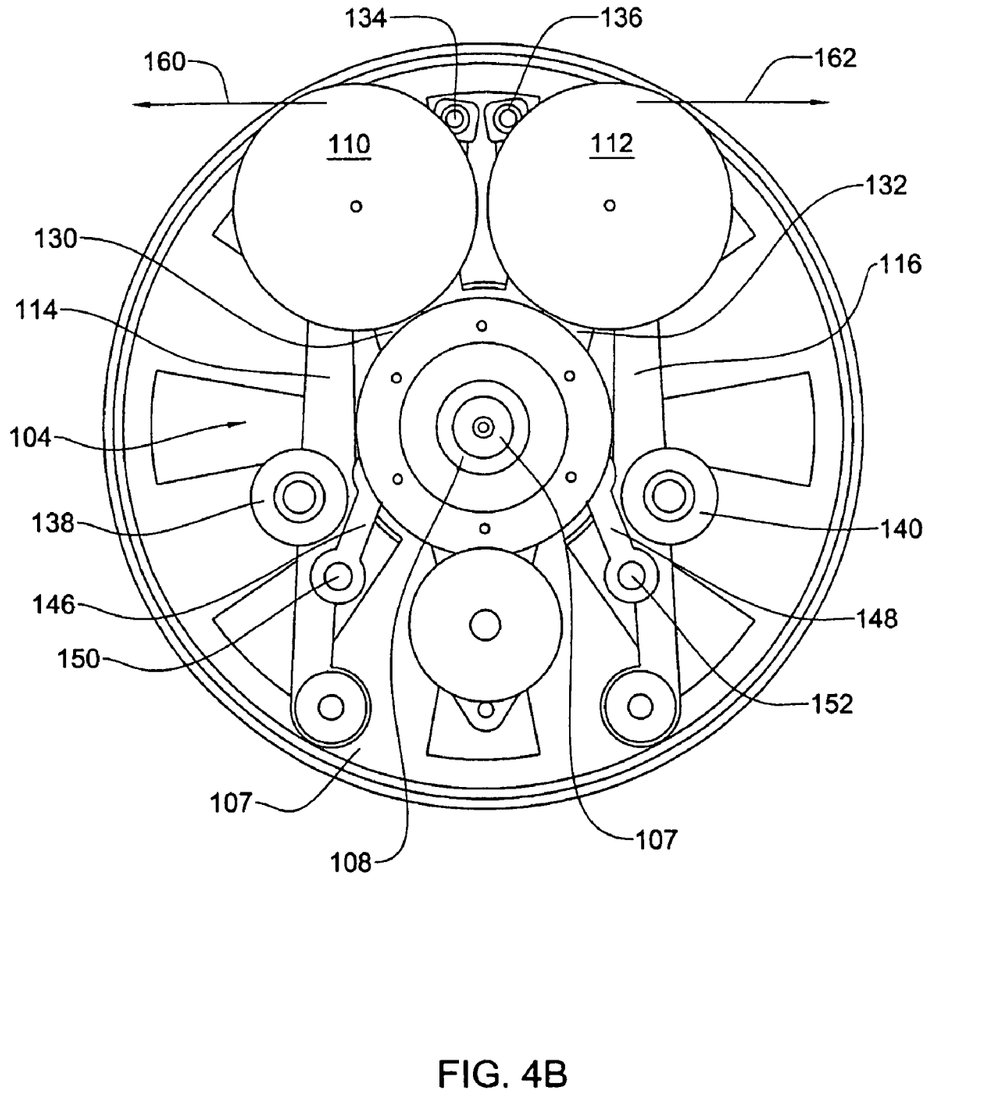
FIGS. 4B and 4C are, respectively, side elevation and isometric views of the traction system of FIG. 4A with the front wheel and the flexible track belt removed for better viewing of the track belt tensioning system.
Figure 4C:
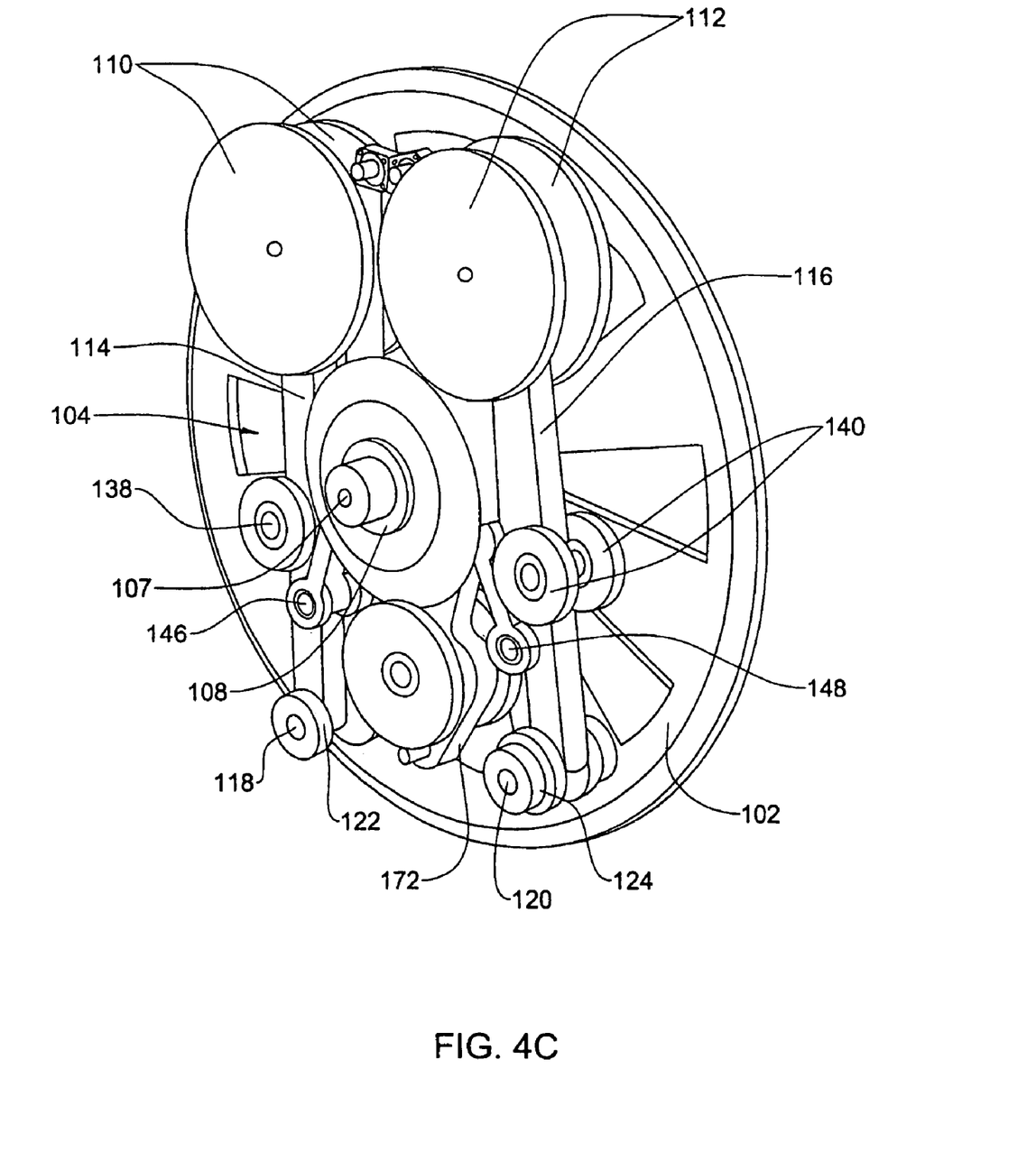
Figure 4D:
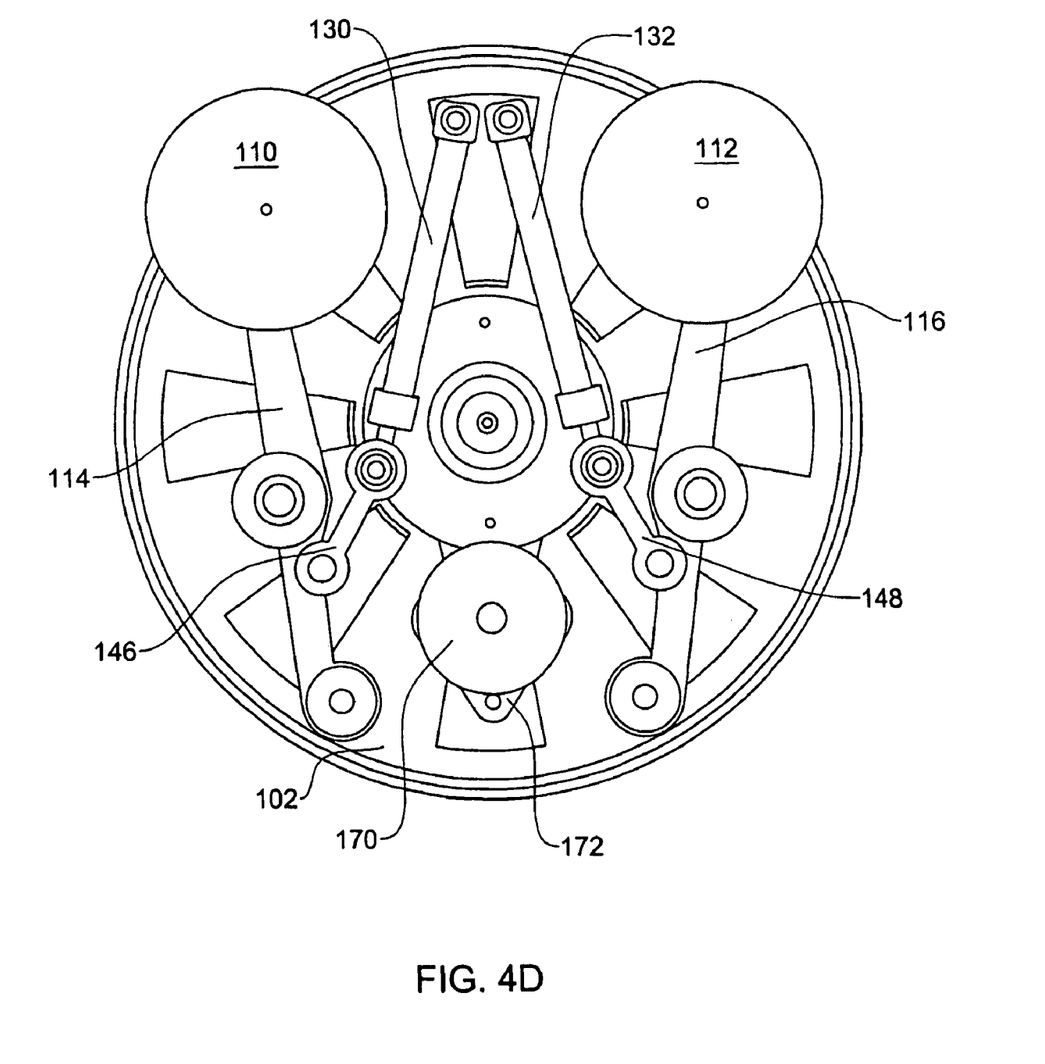
FIGS. 4D-4G show a succession of different traction configurations of a traction system in accordance with another embodiment of the invention.
Figure 4E:
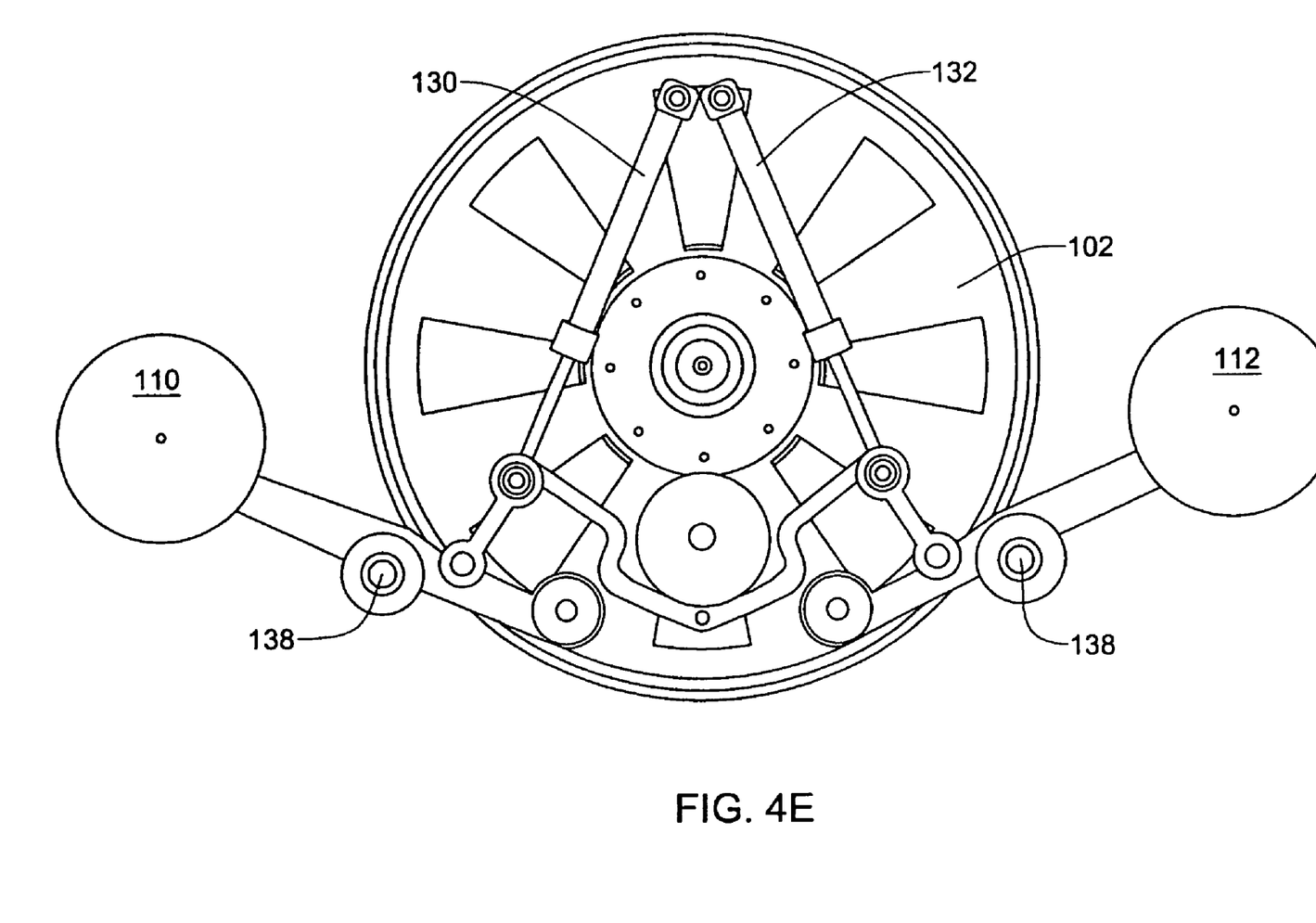

Reference is now being made to FIGS. 4B and 4C which are respectively side elevation and isometric view of the traction system in the configuration shown in FIG. 4A with one of wheels 102 and with the track belt removed to permit better view of the components of the track belt stretching system 104.

Stretching system 104 includes two pairs of track belt extension wheels, including wheels 110, and wheels 112, revolvably attached at respective ends of arms 114 and 116. Arms 114 and 116 are each pivotally fixed at 118 and 120, respectively, two respect pivot members 122 and 124 that are rigidly linked to axle 107 (the link not shown for ease of illustration).

System 104 also includes two hydraulic piston members 130 and 132 pivotally anchored at 134 and 136 to a member (not shown) which is rigidly linked to axle 107. In this manner arms 114 and 116 as well as piston members 130 and 132 are indirectly anchored to the chassis of the vehicle (through axle 107 which is in fact a chassis extension).

Provided on each of arms 114 and 116 are a pair of auxiliary wheels 138 and 140.

Piston members 130 and 132 are linked, in a pivotal manner, to levers 146 and 148 which are in turn pivotally linked at 150 and 152 to respective arms 114 and 116. Thus, by extension of the piston, arms 114 and 116 are angularly displaced in the direction of arrows 160 and 162, respectively, thereby stretching the track belt as will be shown below.

System 104 also includes a spring system generally designated 170 that includes a spring member 172 that provides a biasing force for retracting the arms 114 and 116 on the one hand and provides some resilience to the arms in their stretched position on the other hand.

Figure 4F:
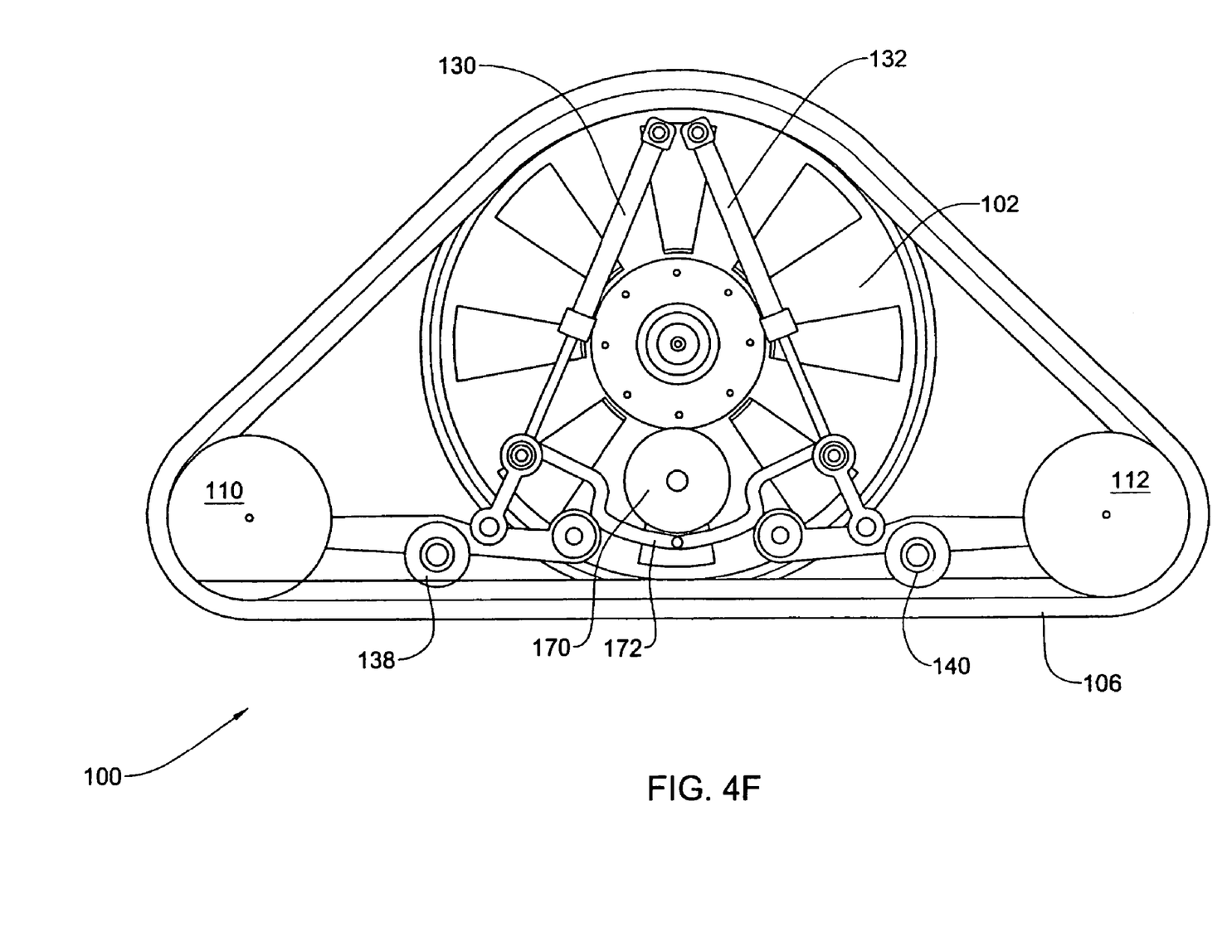
Figure 4G:
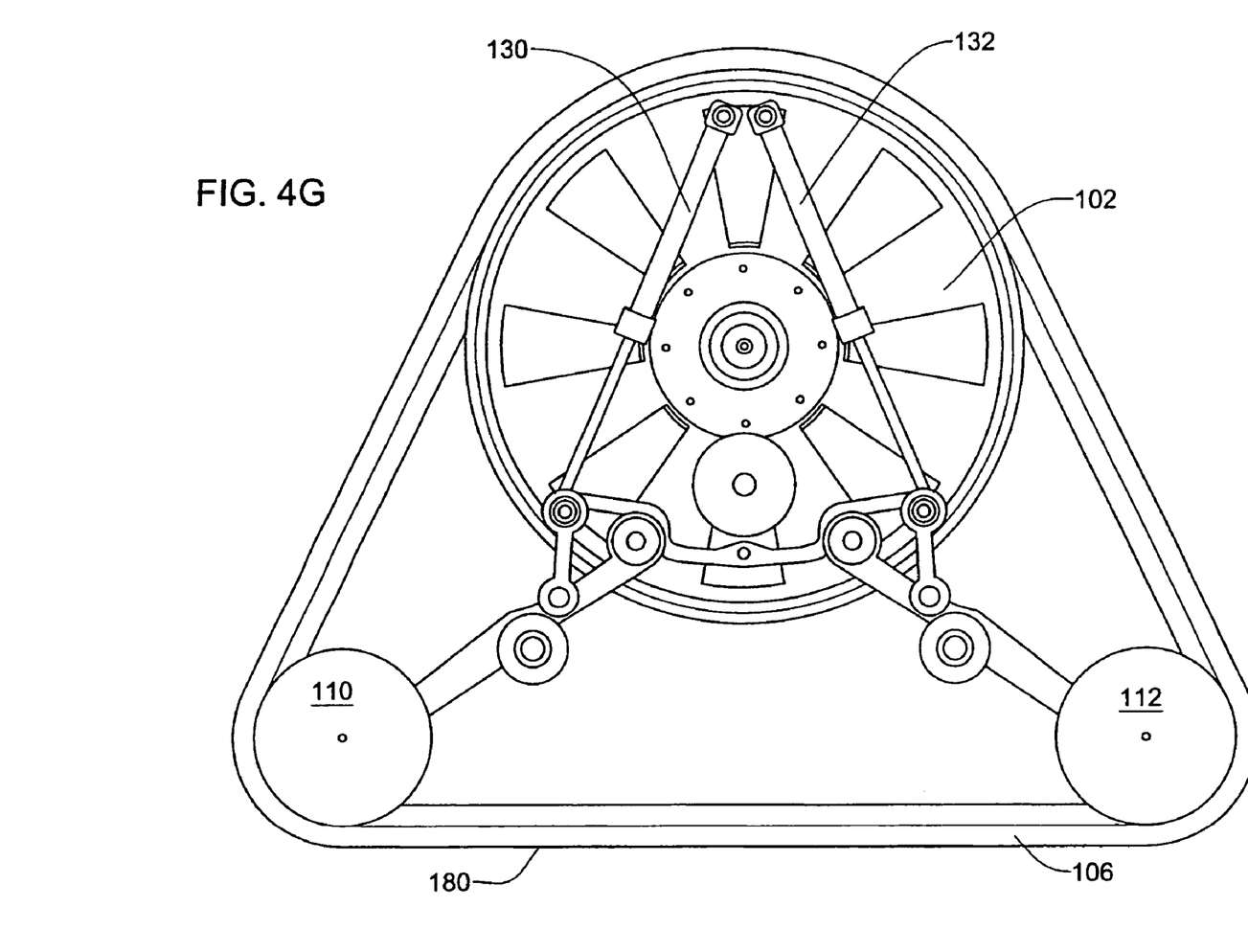

A series of successive stretched configurations of the traction system 100 can be seen in FIGS. 4D-4G. In FIGS. 4F and 4G, the stretchable track belt has been included for clear illustration of the function. With reference made now to FIG. 4F, it can be seen that in this configuration the track belt is stretched defining a straight ground engaging section 180. In this configuration, the vehicle is in fact supported by the main wheel 102 and by the track belt tensioning wheels 110 and 112. In this configuration, auxiliary wheels 138 and 140, serve to further stabilize the track belt in its position.

In the configuration of the traction system 100 which can be seen in FIG. 4G, the track belt is fully stretched and the surface support is now only through wheels 110 and 112, with the vehicle being elevated above the ground as compared to the configuration in FIG. 4F.

As can be appreciated, support 101 may be engaged rotatably to a motor in order to propel the vehicle.

Figure 5A:
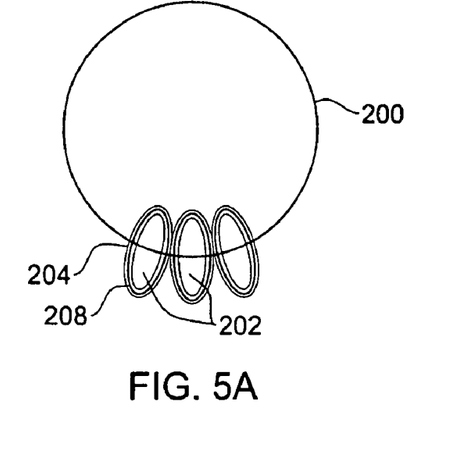
FIG. 5A is a schematic illustration of a portion of a flexible track belt according to an embodiment of the invention showing ring-like elements of which the belt is made.
Figure 5B:
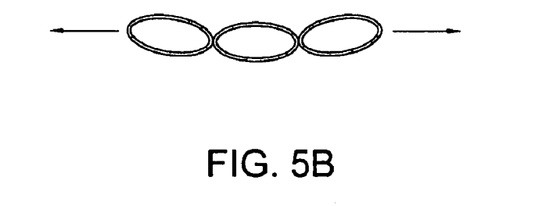
FIG. 5B is a schematic illustration of a portion of the track belt of FIG. 5A in a stretched state.

Reference is now being made to FIG. 5A, which is a schematic representation of a portion of a track belt 200 which includes a plurality of linked ring-like elements 202. Each of these ring-like elements which is made from a flexible thermoplastic material 204 and includes an internal reinforcement element 208. Thus when stretched, into the position shown in FIG. 5B, through the reinforcing element 208, the integrity of the track belt is maintained.

Figure 5C:
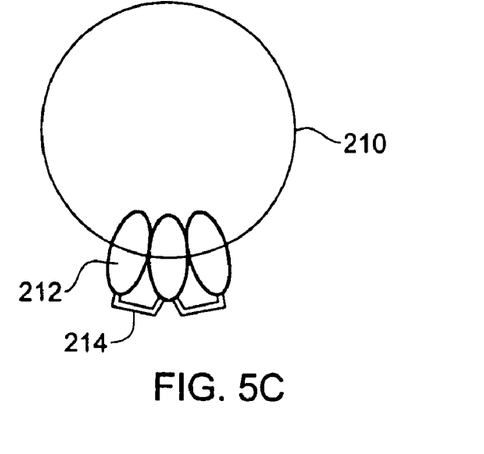
FIG. 5C is a schematic illustration of a portion of a flexible track belt according to an embodiment of the invention showing elements of the kind shown in FIG. 5A with tracking soles filled thereto.
Figure 5D:
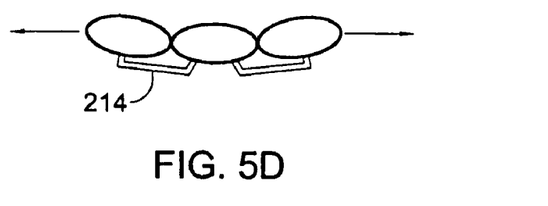
FIG. 5D is a schematic illustration of a portion of the track belt of FIG. 5D in a stretched state.

Another embodiment of a track belt 210 can be seen in FIG. 5C. Similarly as in the embodiment of FIG. 5A, the track belt includes a plurality of integral belt elements 212 linked by members 214, which serve both for ground engagement and for structure reinforcement. When extended, members 214 maintain the track belt integrity.

Figure 6:
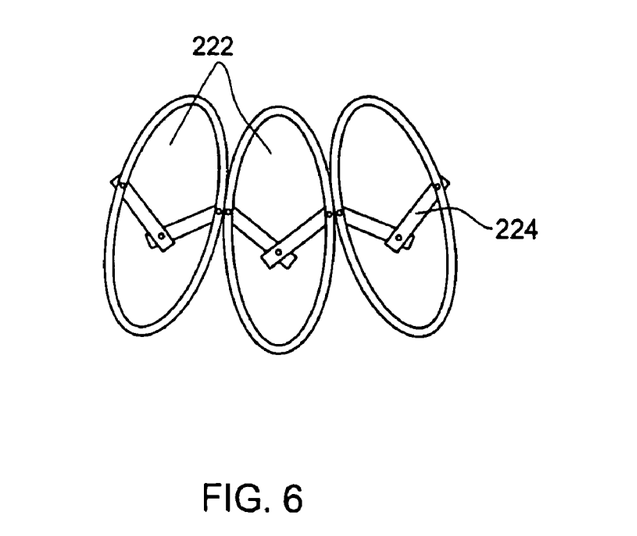
FIG. 6 is a schematic illustration of a side view of a portion of stretchable belt according to another embodiment of the invention.

Another embodiment of a track belt is shown schematically in FIG. 6. Here again, a portion of the belt only is seen and similarly as in the embodiment of FIGS. 5A and 5C, it includes a plurality of belt elements 222 including each an elongation limiter 224.

Figure 7:
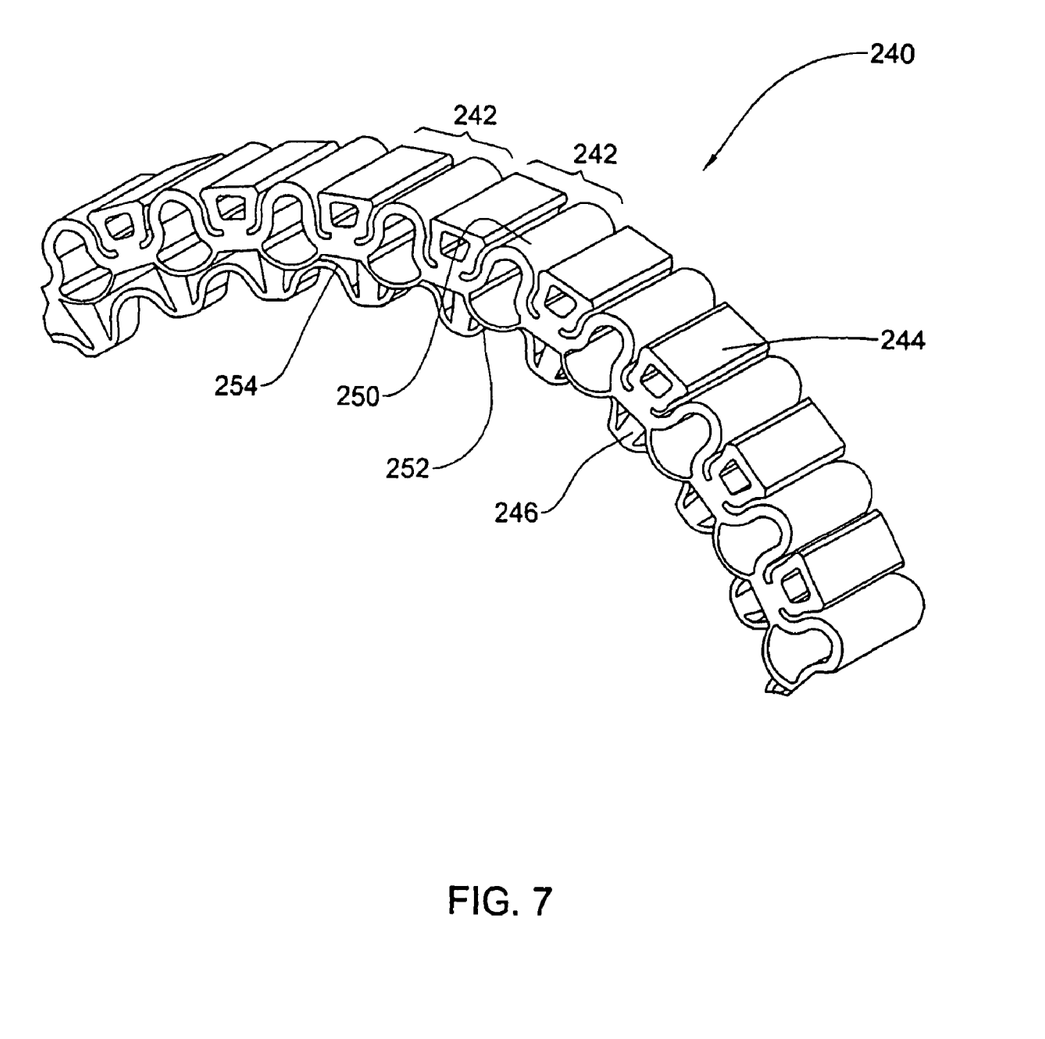
FIG. 7 shows a traction belt in accordance with another embodiment of the invention seen here in isolation in its circular form.

A portion of the track belt 240 in accordance with another embodiment of the invention can be seen in FIG. 7. In accordance with this embodiment, the track belt is formed integrally from a flexible elastic material. The track belt is formed with a plurality of repeating integrally formed units 242. Each unit 242 includes a relatively rigid surface engaging member 244, an opposite radial projection 246 which fits into the gap formed between two pairs of wheels 138 and 140 two pairs of stretching wheels 110 and 112 (see FIGS. 4A-4G). Each element includes also two linking elements including an outwardly undulated sheet 250 and oppositely a thinner and shorter sheet 252. A third connecting element is sheet 254 that extends between adjacent projections 246.

Figure 8A:
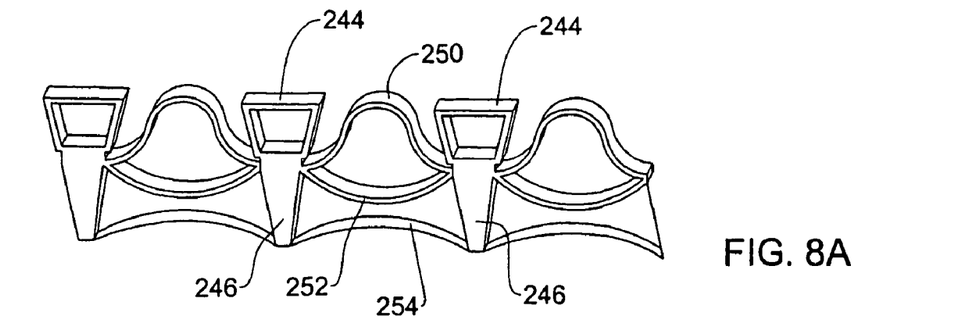
FIGS. 8A-8D show a longitudinal cross-section through a portion of the track belt of FIG. 7 in an initial and a succession of stretched states.
Figure 8B:
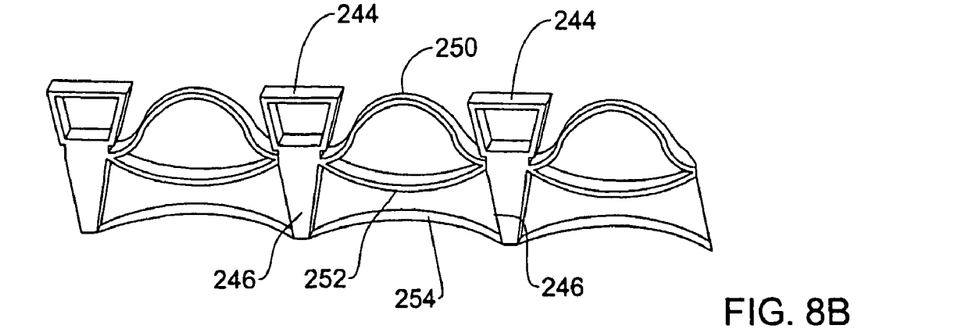
Figure 8C:
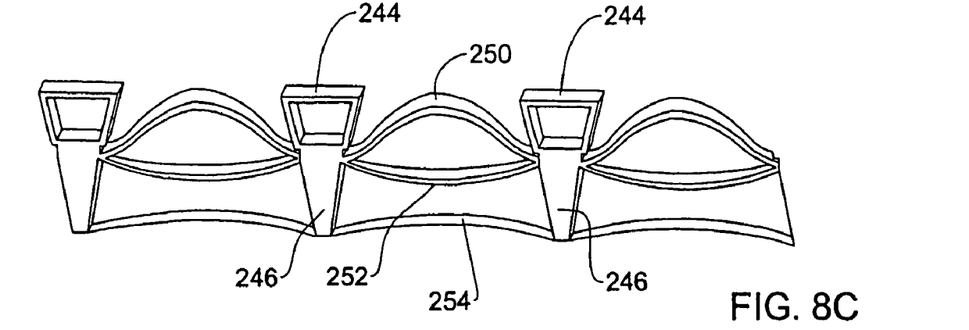
Figure 8D:
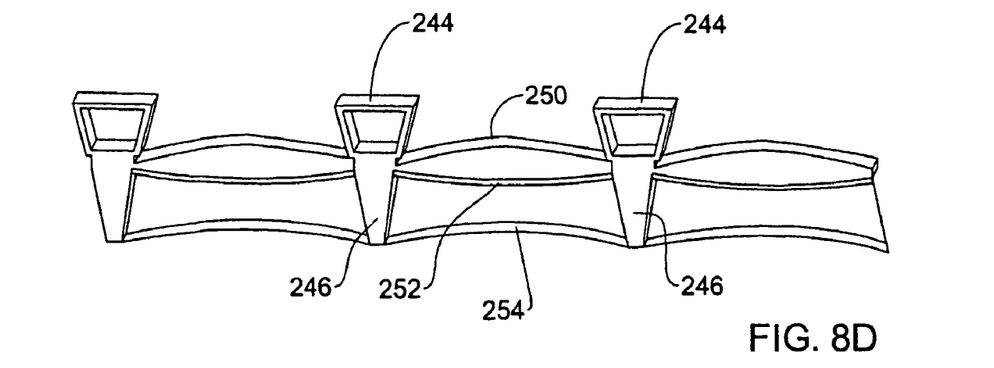
Figure 9A:
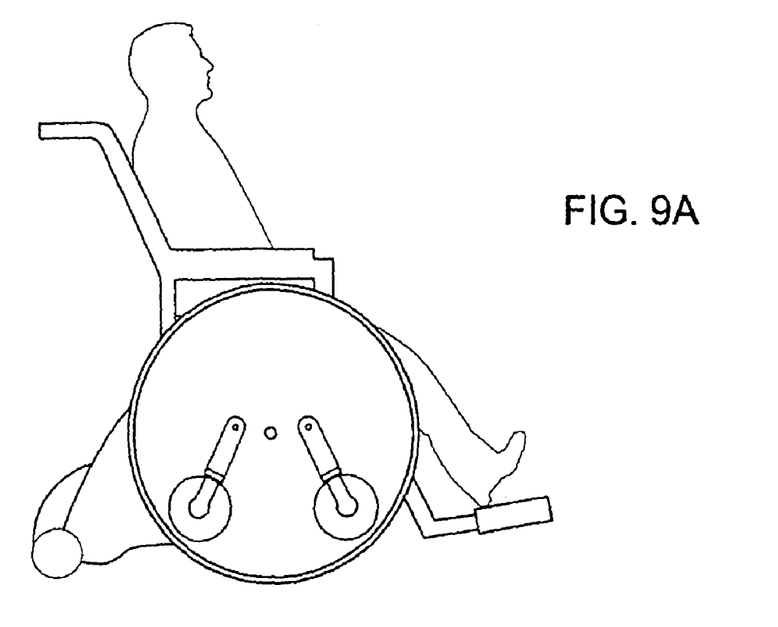
FIGS. 9A and 9B show the traction system of the invention fitted onto a wheelchair, in two different traction configurations.
Figure 9B:
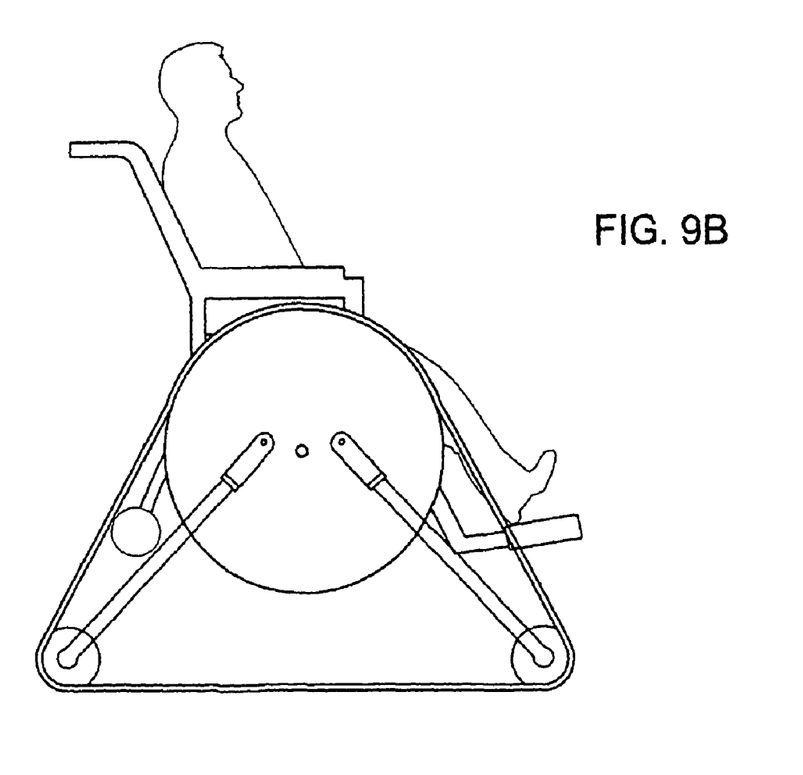
Figure 10A:
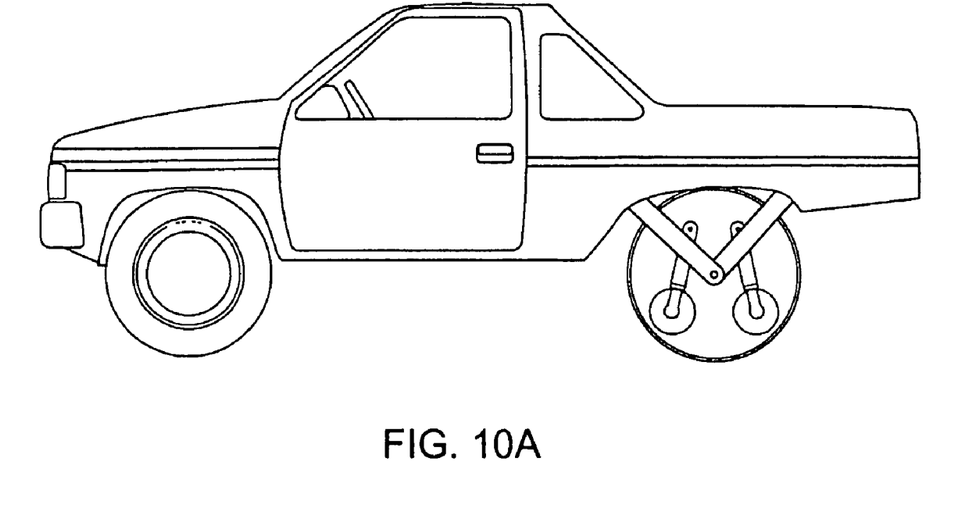
FIGS. 10A and 10B show the traction system of the invention fitted onto an SUV, in two different traction configurations.
Figure 10B:
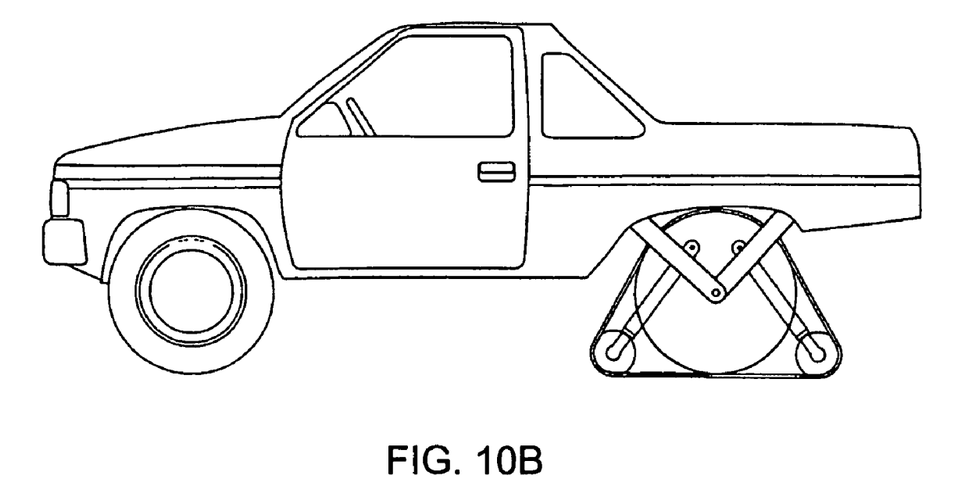
Figure 11A:
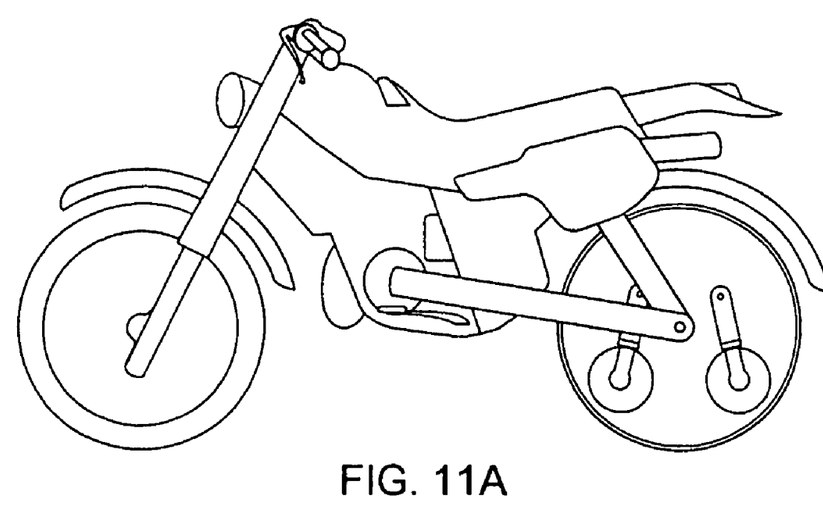
FIGS. 11A and 11B show the traction system of the invention fitted onto a motor cycle, in two different traction configurations.
Figure 11B:
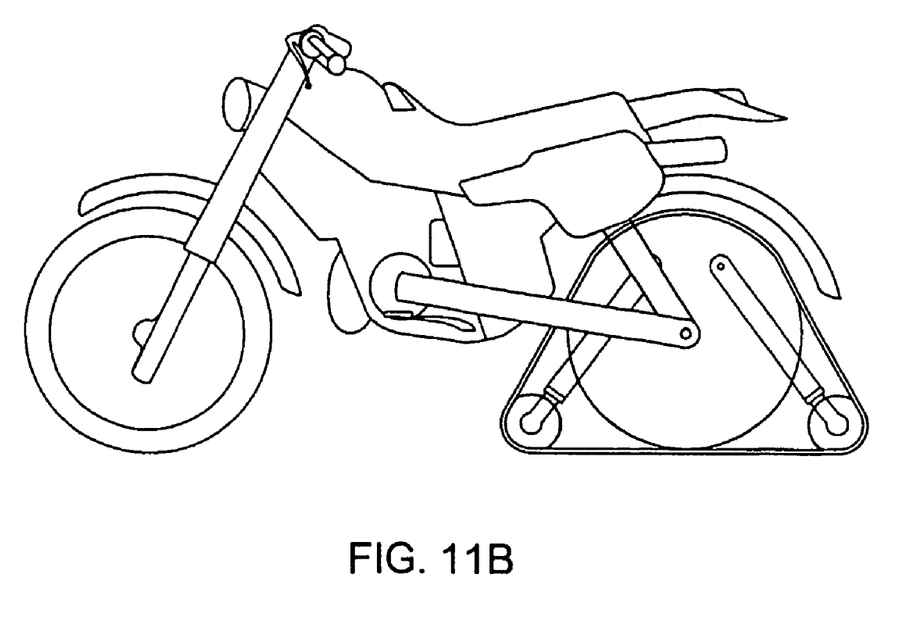

A side elevation of a portion of the track belt of FIG. 7 in various states including a contracted state shown in FIG. 8A and a succession of stretched states shown in FIGS. 8B-8D. As can be seen in FIG. 7, to which reference is again made, in the contracted state, the track belt is biased into a circular shape. Upon stretching, the first element to be stretched is connecting element 252, with the other connecting element 250 being relatively relaxed. Upon further stretching, element 250 is recruited into the stretching process.

In its contracted state, the track belt travels relatively smoothly over a smooth surface. In case of a rough surface, in which case the traction system is changed to the configuration of the kind shown in FIG. 4F or 4G, the flanks of members 244 can firmly engage with ground elements, obstacles, stairs, etc.

A wheelchair, an SUV and a motor cycle, fitted with a traction system of the invention, each, in two traction configurations, can be seen in FIGS. 9A to 11B.

What is claimed is:

1. A traction system for a vehicle, comprising:
a support frame defining a substantially circular track belt support that is revolvable about an axis at the center of the support frame, said axis being in a fixed position with respect to a chassis of the vehicle;
a flexible track belt; and
a track belt stretching assembly comprising one or more track belt stretching rollers;
said system having one traction configuration in which the flexible traction belt is held on said support track forming a substantially circular, wheel-like traction surface, said belt stretching assembly can change to a belt stretching state in which said rollers engage said belt and stretch said belt out from said belt's relatively relaxed state in said one traction configuration, to a stretched state to define one or more other traction configurations of the system.

2. A traction system according to claim 1, wherein said rollers are held on distal ends of belt extension arms attached at the proximal end of said belt extension arms to the vehicle's chassis.

3. A traction system according to claim 2, wherein said revolvable support frame comprises two coaxial circular cooperating support members with a gap between said coaxial circular cooperating support members defining together said circular track belt support, a void space extending radially from the axis to the lateral part of said gap defining a track belt stretching assembly-holding space, said belt-stretching assembly being housed within said space in said one traction configuration.

4. A vehicle comprising one or more traction systems according to claim 1.

* * * * *